(12) United States Patent
Mueller (10) Patent No.: US 7,108,496 B2
(45) Date of Patent: Sep. 19, 2006

(54) STACK MOULD ASSEMBLY

(75) Inventor: Wolf-Dieter Mueller, Buehl (DE)

(73) Assignee: GlaxoSmithKline Consumer Healthcare GmbH & Co. KG, Buehl (DE)

( * ) Notice: Subject to any disclaimer, the term of this patent is extended or adjusted under 35 U.S.C. 154(b) by 128 days.

(21) Appl. No.: 10/344,210

(22) PCT Filed: Aug. 13, 2001

(86) PCT No.: PCT/EP01/09350

§ 371 (c)(1),
(2), (4) Date: Jul. 31, 2003

(87) PCT Pub. No.: WO02/13656

PCT Pub. Date: Feb. 21, 2002

(65) Prior Publication Data

US 2004/0012117 A1    Jan. 22, 2004

(30) Foreign Application Priority Data

Aug. 16, 2000 (GB) .................................. 0020021.2

(51) Int. Cl.
*B29C 45/26* (2006.01)
(52) U.S. Cl. .................. 425/112; 425/120; 425/116; 425/129.1; 425/234; 425/805; 264/243; 264/255
(58) Field of Classification Search ............... 264/255, 264/243, 275, 247; 425/805, 116, 112, 126.1, 425/127, 129.1, 120, 234
See application file for complete search history.

(56) References Cited

U.S. PATENT DOCUMENTS

| | | | | |
|---|---|---|---|---|
| 4,734,023 A | * | 3/1988 | Nesch et al. ................. | 425/130 |
| 4,744,741 A | * | 5/1988 | Glover et al. ................ | 425/123 |
| 5,256,048 A | * | 10/1993 | Jacobs et al. ................ | 425/130 |
| 5,538,410 A | | 7/1996 | Yoo et al. | |
| 5,609,890 A | * | 3/1997 | Boucherie .................... | 425/120 |
| 6,379,139 B1 | * | 4/2002 | Boucherie ................. | 425/129.1 |

FOREIGN PATENT DOCUMENTS

| | | |
|---|---|---|
| EP | 0463217 A | 1/1992 |
| EP | 0676268 A | 10/1995 |

* cited by examiner

*Primary Examiner*—Edmund H. Lee
(74) *Attorney, Agent, or Firm*—Nora Stein-Fernandez; Theodore R. Furman

(57) ABSTRACT

An injection moulding process for making a toothbrush involving a stack mould assembly of at least three mould blocks (1, 2, 3, 4) arranged for use along a longitudinal stack axis (A—A), with two end mould blocks (3, 4), and an intermediate mould block (1, 2), with part mould cavities (11A, 21, 31, 41, 51) in the blocks. Plastic toothbrush skeletons are made in a cavity (11A, 21, 31) between the intermediate block (1, 2) and one end block (3), then elastomer parts are made in a cavity (41, 51) between the intermediate block (1, 2) and the other end block (4). Preferably the intermediate block (1) rotates so its part cavity (11A) faces the other end block (4). Stack mould assemblies (1, 2, 3, 4) for this process are provided. The assembly (1, 2, 3, 4) provides a compact mould with high output.

9 Claims, 7 Drawing Sheets

Fig. 3B
step (2)

Fig. 3A
step (1)

Fig. 3

Fig. 7
step (6)

Fig. 8
step (7)

STACK MOULD ASSEMBLY

FIELD OF THE INVENTION

This invention relates to a process for making toothbrushes, in particular an injection moulding process.

BACKGROUND OF THE INVENTION

Toothbrushes are well-known articles and normally comprise a head and a grip handle, generally with a narrowed neck region in between, all arranged along a longitudinal head-handle axis. Normally toothbrushes are made primarily of a hard plastic material, e.g. a polypropylene or styrol acryl nitrol ("SAN"). Many are so called two-component toothbrushes, i.e. comprising parts made of hard plastic, e.g. the head and the main structure or "skeleton" of the handle, and parts made of a softer resilient elastomer or rubbery material, such as a thermoplastic elastomer e.g. Santoprene™ e.g. comprising part of the grip handle, to enhance grip, aesthetic appearance or to influence flexibility. Such toothbrushes are disclosed for example in U.S. Pat. No. 5,054,154 and EP-A-0 336 641 among others.

Toothbrushes are normally made by an injection moulding process in which the hard plastic material of which their main structure is made is injected in a fluid state into a first mould cavity which accurately defines the shape of the hard plastic part to be formed. The mould cavity is normally formed in a hard metal (usually steel) mould block, using a process of spark-erosion also known as electro-discharge machining. Normally when the toothbrush head is formed in such a process pins are provided ("bristle pins") projecting onto the part of the cavity in which the head is to be formed, to form holes in the plastic material of the head into which tufts of bristles can subsequently be fixed. With two component toothbrushes a "skeleton" of hard plastic is first made in this way then the skeleton is enclosed in a second mould cavity and the material of the second component in a fluid state is injected into this second cavity to form the second component parts. Normally the skeleton is formed with voids to receive this second material. Normally such injection moulds are mould assemblies comprising one or more, generally two, mould blocks each with a part mould cavity therein, which when brought together in the assembled mould define a complete mould cavity between them. Such processes are well known. WO-A-94/05183, EP-A-0 504 571, EP-A-0 836 923 and DE-A-195 22 122 describe such processes and suitable moulding machinery for their performance.

Generally such moulding processes involve large and complex machinery and such machines can take up much floor space in a factory. It is desirable to provide improved moulding machinery for such processes. So called stack moulds are known which can be made very compact. For example U.S. Pat. No. 5,069,615 discloses a stack mould for making plastic articles.

SUMMARY OF THE INVENTION

In its broadest aspect this invention provides a process using a stack mould to manufacture a two component toothbrush comprising parts made of hard plastic, e.g. the head and the main structure or "skeleton" of the handle, and parts made of a softer resilient elastomer or rubbery material, such as a thermoplastic elastomer e.g. comprising part of the grip handle, to enhance grip, aesthetic appearance or to influence flexibility. The invention therefore also provides a stack mould adapted and/or configured to perform such a process.

DETAILED DESCRIPTION OF THE INVENTION

According to this invention in a more specific aspect, a process for making a toothbrush comprises:

providing a stack mould assembly comprising a stack of at least three mould blocks arranged for use along a longitudinal stack axis, comprising two end mould blocks, and an intermediate mould block longitudinally between the two end mould blocks;

there being at least one part mould cavity in a surface of one end mould block which mates with a part mould cavity in a facing surface of the intermediate mould block when the one end mould block and the intermediate mould block are brought together to define a first cavity into which a first moulding material may be injected;

there being at least one part mould cavity in a surface of the other end mould block which mates with a part mould cavity in the intermediate mould block when the said other end mould block and the intermediate mould block are brought together to define a second cavity into which a second moulding material may be injected;

bringing the one end mould block and the intermediate mould block together to thereby form the first cavity;

injecting a first moulding material being a plastic material suitable for forming the hard plastic part of a toothbrush head and handle into said first cavity;

at least partly enclosing the so formed hard plastic part in a second cavity formed by bringing together the other end mould block and the intermediate mould block, and injecting a second moulding material, different to the first plastic material and suitable for forming part of a toothbrush head and/or handle into the second cavity.

Normally before at least partly enclosing the so formed hard plastic part in the second cavity formed by bringing together the other end mould block and the intermediate mould block, the one end mould block and the intermediate mould black are separated.

Preferably the so formed hard plastic part is transferred to the part mould cavity in the other end mould block by retaining at least part of the so formed hard plastic part in the part mould cavity in the intermediate mould block and rotating the intermediate mould block so that the surface of the intermediate mould block in which is the part mould cavity faces the surface of the said other end mould block in which is the part mould cavity.

According to a preferred embodiment of the process of this invention, a process for making a toothbrush comprises:

providing an injection mould comprising;

a first mould block having at least two first part mould cavities therein for forming part of a toothbrush head therein, at least one such first part mould cavity being respectively in each of two opposite-facing surfaces of the first mould block;

a second mould block having at least one second part mould cavity therein for forming part of a toothbrush handle therein, the first and second part mould cavities being capable of mating together to form a part mould cavity defining part of the head and handle of a toothbrush to be formed therein;

a third mould block having at least one third part mould cavity therein for forming part of a toothbrush therein, the third part mould cavity capable of mating together with the first and second part mould cavities to form a part mould cavity defining part of the head and handle of a toothbrush to be formed therein;

a fourth mould block having at least one fourth part mould cavity therein for forming part of a toothbrush, the fourth and first part mould cavities capable of mating together to form a part mould cavity defining part of the head and handle of a toothbrush to be formed therein;

the said first, second, third and fourth mould blocks being arranged in a stack mould assembly such that the first and second mould blocks are intermediate in a stack between the said third and fourth mould blocks;

a fifth part mould cavity being provided in a mould block, the fifth part mould cavity capable of mating together with the first and fourth part mould cavities to form a part mould cavity defining part of the head and handle of a toothbrush to be formed therein, the process comprising the steps of:

(1) bringing the first, second and third mould blocks together so that the respective first, second and third part mould cavities therein mate together to form a mould cavity for forming part of a toothbrush head and handle therein;

(2) injecting a first fluid plastic material into the so-formed mould cavity to thereby form part of a toothbrush head and handle therein, and allowing the first material to harden;

(3) separating the third mould block from the assembly of first and second mould blocks whilst retaining the part toothbrush by its head in a first part mould cavity of the first mould block;

(4) separating the second mould block from the first mould block whilst leaving the part toothbrush retained by its head in a first part mould cavity of the first mould block;

(5) bringing the first mould block and fourth mould block together so as to enclose the so-formed toothbrush head retained in the first part mould cavity in a cavity formed between the first mould block and the fourth part mould cavity in the fourth mould block;

(6) with the so-formed toothbrush head retained in the cavity between the first and fourth mould blocks, enclosing the so-formed part toothbrush handle in a handle mould cavity formed by mating a fourth mould cavity in the fourth mould block with a fifth mould cavity in a mould block brought together with the fourth mould block, (7) injecting a second fluid material into the so-formed handle mould cavity and allowing the second material to harden, so as to form parts of the toothbrush made of the second material;

(8) removing the part formed toothbrush from the mould block assembly.

The above described steps (1) to (8) may be optionally repeated so as to provide continuous production of toothbrushes.

The so-formed part of a toothbrush head and handle may then be removed from the assembly of mould blocks and subjected to further processing such as the insertion of bristles into the head, etc. Alternatively bristles may be fixed into the head at an earlier stage, for example during the moulding process in which the head is formed, by the known so called "anchorless" process of inserting the bristles into the first or second part mould cavity so that their ends extend into the cavity, and introducing the first plastic material into the cavity to form the head and simultaneously weld the ends of the bristles into the head. Such processes are described in for example EP-A-0 142 885, EP-A-0 197 384 and EP-A-0 326 634. However, as will be explained later, the bristling pins used to form the bristle holes in the head into which the bristles are subsequently inserted provide a convenient way of retaining the part formed toothbrush in a mould cavity. Therefore if the "anchorless" process is used an alternative way of retaining the part formed toothbrush in a mould cavity may be necessary.

Preferably the third part mould cavity in the third mould block defines part of a toothbrush head and handle.

Preferably the second mould block has the fifth part mould cavity therein in a surface opposite that in which the second part mould cavity is formed. Alternatively a fifth mould block having the fifth part mould cavity therein may be provided.

Preferably step (5) involves a rotation operation in which the first mould block, with the part formed toothbrush retained therein, is rotated, suitably through 180° so that its first part mould cavity(ies) in which the part formed toothbrush head is retained faces the fourth mould block. To facilitate such a rotation operation it is necessary to ensure that the mould blocks are sufficiently far apart that the part formed toothbrush retained in the first mould block does not collide with any other mould block or any other part of the machinery involved.

Preferably the first mould block has a surface opposite to that in which the first part mould cavity is formed, and in the opposite surface there is one or more further first part mould cavity. Such further first part mould cavity is suitably identical to the first part mould cavity. With such a construction, preferably step (6) involves an operation in which at least one empty further first part mould cavity, in the opposite face to that on which is/are situated the first mould cavity(ies) in which a part formed toothbrush is retained, is brought together with an empty second part mould cavity in a second mould block. Preferably in this operation the empty first, second and third mould blocks fit together so that the respective further first, second and third part mould cavities therein mate together form a mould cavity for forming part of a toothbrush head and handle therein, i.e. to perform a step (1) as described above. In such a way, steps (1) and (6) may advantageously be performed substantially simultaneously, and also injection steps (2) and (7) may also be performed substantially simultaneously using the first and further first part mould cavities on opposite sides of the first mould block, facilitating a high-throughput process.

Preferably, for example in step (3), the toothbrush head is retained in the first part mould cavity by bristle pins projecting into the first part mould cavity. Preferably the head is subsequently released from the first part mould cavity by the withdrawal of these bristle pins. Moulds in which such bristle pins can be withdrawn are generally known.

Preferably injection steps (2) and (7) are hot runner injection moulding steps. Hot runner moulding is a well known process.

Each of the said mould blocks may have a multiple of the respective above-mentioned part mould cavities, which may be used in parallel simultaneous operation. Mould blocks with multiple cavities therein are well known in the toothbrush industry.

Preferably the second material injected in step (7) is a thermoplastic elastomer material, of a known type for use with two-component toothbrushes.

Suitable plastics materials for use as the first material include those with a modulus of elasticity of at least about 500 Mpa, preferably at least about 1000 Mpa, these being conventional in the toothbrush art. Suitable materials include for example, polyamides and polypropylenes. An example of a suitable polyamide is the material 'Ultramid B3™' (marketed by BASF, Federal Republic of Germany), having a modulus of elasticity (DIN 53452) of 3000. An example of a suitable polypropylene is the material 'Novolene 1100 HX™' (marketed by BASF, Federal Republic of Germany), which is a homopolymer and has a modulus of elasticity (DIN 53457) of 1400. Such a polypropylene homopolymer may optionally be used in admixture with a polypropylene block co-polymer, such as the material 'Novolene 2500HX™' (marketed by BASF, Federal Republic of Germany), for example in an 80:20 mixture by weight (1100 HX:2500 HX). Other suitable polypropylenes include Polypropylene PM 1600™ (marketed by Shell) and having a modulus of elasticity (ISO 178) of 1500 Mpa and Apryl 3400 MAI™ from Elf Atochem.

Preferably the second moulding material is an elastomeric material, for example a thermoplastic elastomer. The term "elastomeric material" as used herein is synonymous with such terms as "elastomer", "elastomer material", "rubber" and "rubbery material". The term includes synthetic and natural elastomers. The term includes materials which on compression deform and spring back immediately or very quickly on release of the pressure. Preferably the elastomeric material has a hardness from about 10 to about 90 Shore A, more preferably 30 Shore A or greater. Suitable elastomeric materials include those available under the trade names Megol and Santoprene, and silicone elastomeric materials may also be used. Other suitable elastomeric materials are disclosed in the state of the art referred to above.

Suitably the moulding conditions in step (7) are such that the second material binds to the first plastic material. Suitable condition are known.

The invention also provides a stack mould assembly comprised of two end mould blocks and an intermediate mould block longitudinally between the two end mould blocks, there being at least one part mould cavity in a surface of one end mould block which mates with a part mould cavity in a facing surface of the intermediate mould block when the one end mould block and the intermediate mould block are brought together to define a first cavity, corresponding to the shape of part of a toothbrush, into which a first moulding material may be injected, there being at least one part mould cavity in a surface of the other end mould block which mates with a part mould cavity in the intermediate mould block when the said other mould block and the intermediate mould block are brought together to define a second cavity, corresponding to the shape of part of a toothbrush, into which a second moulding material may be injected.

The invention also provides a stack mould assembly suitable for performing a process according to the preferred aspect of the invention as described above.

Such a stack mould assembly may comprise:

a first mould block having at least two first part mould cavities therein for forming part of a toothbrush head therein, at least one such first part mould cavity being respectively in each of two opposite-facing surfaces of the first mould block;

a second mould block having at least one second part mould cavity therein for forming part of a toothbrush handle therein, the second part mould cavity and first part mould cavity being capable of mating together to form a part mould cavity defining part of the head and handle of a toothbrush to be formed therein;

a third mould block having at least one third part mould cavity therein for forming part of a toothbrush therein, the third part mould cavity capable of mating together with the first and second part mould cavities to form a part mould cavity defining part of the head and handle of a toothbrush to be formed therein;

a fourth mould block having at least one fourth part mould cavity therein for forming part of a toothbrush, the fourth and first part mould cavities capable of mating together to form a part mould cavity defining part of the head and handle of a toothbrush to be formed therein;

the said first, second, third and fourth mould blocks being arranged in the stack mould assembly such that the first and second mould blocks are intermediate in a stack between the said third and fourth mould blocks;

a fifth part mould cavity being provided in a mould block, preferably in the second mould block, the fifth part mould cavity capable of mating together with the first and fourth part mould cavities to form a part mould cavity defining part of the head and handle of a toothbrush to be formed therein.

The invention also provides respective first, second, third, fourth and optional fifth mould blocks having respective part mould cavities therein, suitable for use in the stack mould assembly described above.

The invention also provides a toothbrush manufacturing machine constructed to use the above-described process and/or incorporating the above-mentioned first, second, third and fourth mould blocks and/or an assembly thereof.

The invention also provides toothbrushes being a product of the above-described process and/or machine.

BRIEF DESCRIPTION OF THE DRAWINGS

The invention will now be described by way of non-limiting example only with reference to the following drawings, of which.

Features shown in FIGS. 1–9 are listed and identified below:

Two component toothbrush 101 (generally)
Head 102
Grip handle 103
Neck 104
Hard plastic skeleton 105, with upper and lower surfaces 105A, 105B.
Elastomeric part 106, with top and bottom surfaces 106A, 106B.
Reinforcing flanges 107
Apertures 108
Bristle holes 109
First mould block 1
Opposed surfaces 1A, 1B
First part mould cavities 11A, 11B
Second mould blocks 2
Surfaces 2A
Second mould cavities 21
Third mould block 3
Third part mould cavities 31
Surface 3A
Injection ports 32
Fourth mould block 4
Fourth part mould cavities 41
Surface 4A
Injection ports 42
Surface 2B
Fifth mould cavities 51
Mould cavity 11,21,31
Mould parting lines 123, 124
Bristle pins 13
Cavity 11,41
Handle mould cavity 41,51

Figure 1:
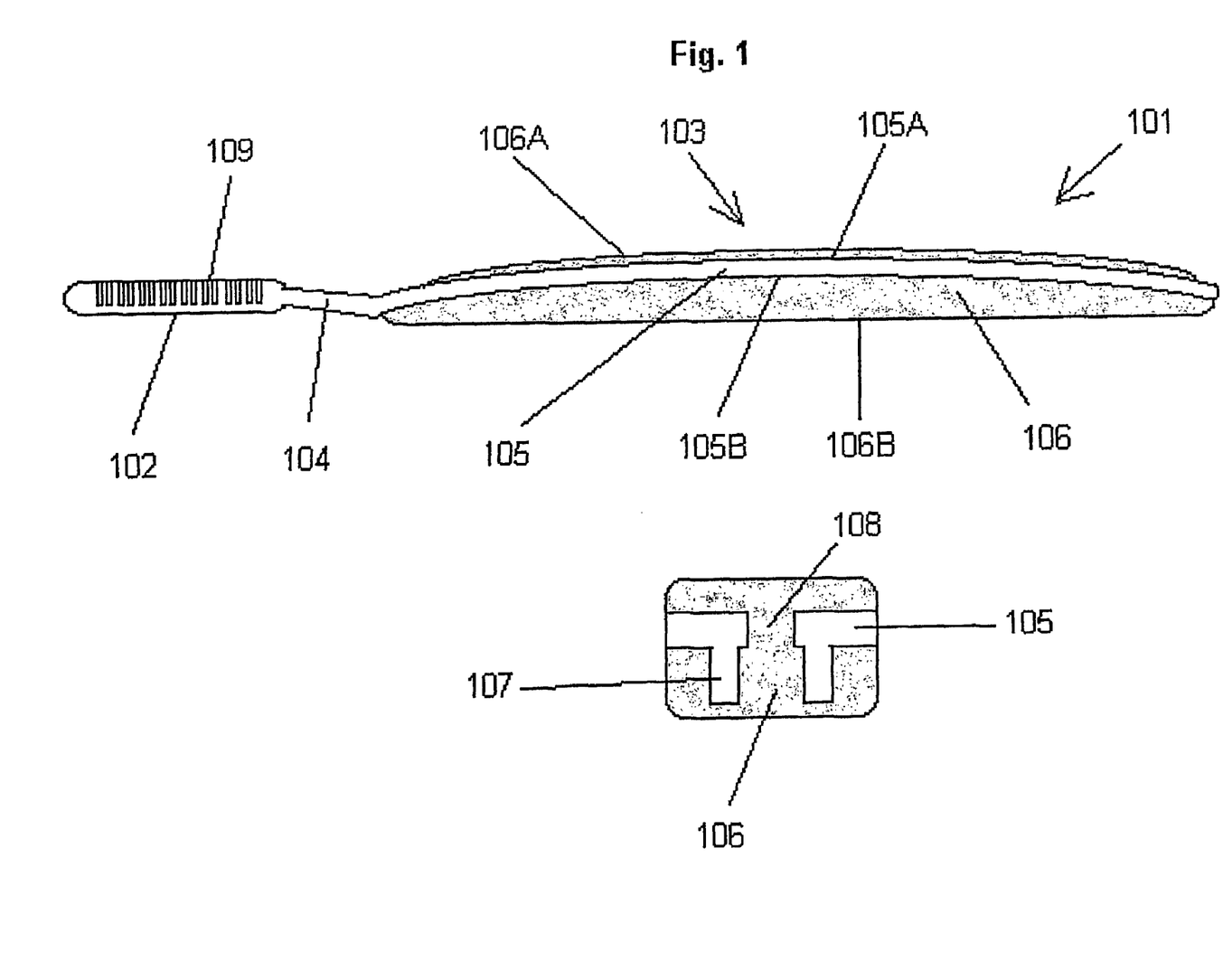
FIG. 1 shows typical longitudinal and cross sections of a typical two-component toothbrush.

Referring to FIG. 1, a two component toothbrush 101 (generally) comprises a head 102, a grip handle 103, and a neck region 104 in between, all arranged along a longitudinal head-handle axis. The toothbrush 101 comprises a hard plastic skeleton 105, comprising the head 102, neck 104 and part of the handle 103, and a second component elastomeric part 106, forming a grip-enhancing pad on the handle. Internally the grip handle 103 includes reinforcing flanges 107 (such flanges are known in the art, e.g. from the applicant's toothbrushes launched in 1993) to stiffen the handle 103, and apertures 108 which put upper and lower surfaces 105A and 105B of the skeleton 105 into communion. There are bristle holes 109 in the head 102, into which bristles (not shown) may subsequently be inserted.

Figures 2, 2A:
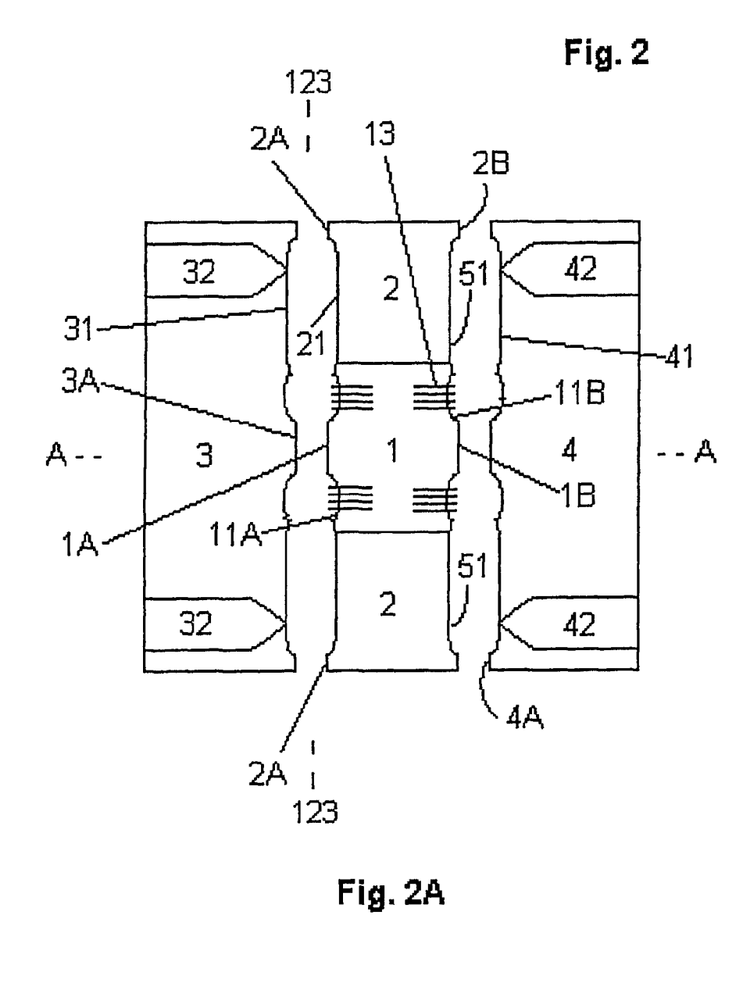
FIGS. 2–9 show schematically an assembly of mould blocks and their use in a process of this invention.

Referring to FIG. 2 an assembly of injection mould blocks is shown. This assembly is a stack mould assembly arranged along a longitudinal stacking axis A—A.

Figure 2B:
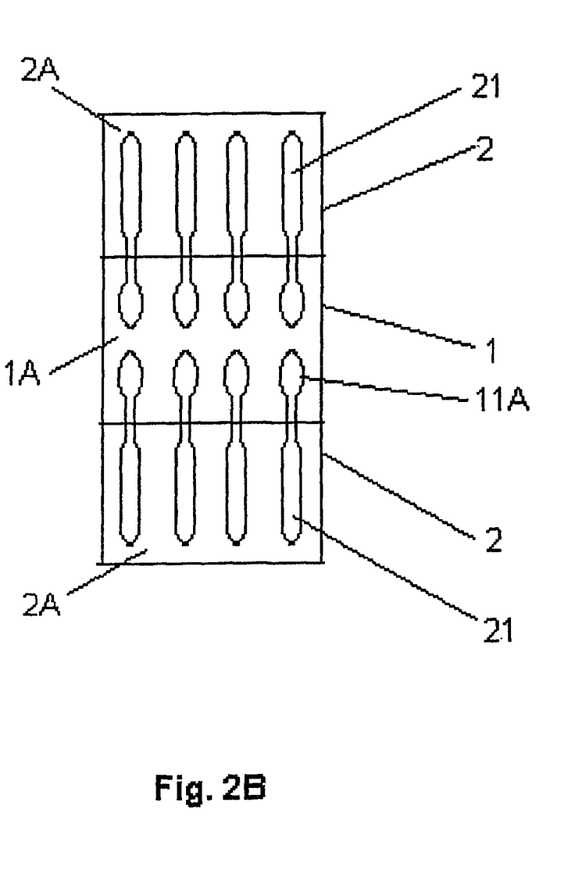

The stack comprises a first mould block 1, which has two opposed surfaces 1A, 1B facing in 180° opposite directions. Surface 1A has a plurality (four are shown, there may be more or less) of first part mould cavities 11A therein for forming part of a toothbrush head therein. Opposite surface 1B has a plurality (four are shown, there may be more or less) of further first part mould cavities 11B therein for forming part of a toothbrush head therein. Surfaces 1A and 1B are identical. FIG. 2B shows a surface 1A in plan view, and it is seen that these part mould cavities 11A are arranged in a tip-to-tip relationship, i.e. with their head-handle axis directions aligned in 180° opposite directions.

FIG. 2 also shows two second mould blocks 2. These mould blocks 2 can be brought together with first mould blocks 1 at mould parting line 123. Mould blocks 2 each have surfaces 2A which face surfaces 1A along the stacking axis A—A and mate when first and second blocks, 1 and 2 are brought together as shown in FIG. 3. Mould blocks 2 have a multiple of second part mould cavities 21. Four are shown, there may be more or less, but corresponding with the number of part mould cavities 11A. These part mould cavities 21 define the shape of part of the skeleton of a toothbrush handle facing in the bristle direction, i.e. the top surface 105A shown in FIG. 1. It is seen that with the first and second mould blocks 1 and 2 brought together at part line 123, the part mould cavities 21 come together to mate with part mould cavities 11A, meeting the part mould cavities 11A at a place corresponding to the neck region 104 to thereby define the shape of part of a toothbrush skeleton 105 to be formed therein.

FIG. 2 also shows a third mould block 3. Mould block 3 has a multiple (four are shown, there may be more or less, but corresponding with the number of part mould cavities 11A and 21) of third part mould cavities 31 therein for forming part of a toothbrush head and handle therein. These part mould cavities 31 define the shape of part of the skeleton 105 of a toothbrush handle facing in the opposite direction to the bristle direction, i.e. the lower surface 105B shown in FIG. 1. Third mould block 3 has a surface 3A which faces surfaces 1A and 2A and can be brought together with mould blocks 1 and 2 so that surfaces 1A, 2A and 3A meet at parting line 123, and part mould cavities 11A, 21 and 31 mate to form a complete mould cavity defining the shape of part of the skeleton 105 of a toothbrush. Mould block 3 also includes injection ports 32 via which a fluid plastic material may be introduced.

FIG. 2 also shows a fourth mould block 4. Fourth mould block 4 has a surface 4A. Mould block 4 has a plurality (four are present, there may be more or less, but corresponding with the number of part mould cavities 11A and 21) of fourth part mould cavities 41 in surface 4A therein for forming part of a toothbrush therein. These part mould cavities 41 define the shape of part of the elastomer grip pad 106 of a toothbrush handle facing in the opposite direction to the bristle direction, i.e. the bottom surface 106B shown in FIG. 1. Mould block 4 also includes injection ports 42 via which a second fluid plastic material may be introduced.

Second mould blocks 2 have a surface 2B facing in a 180° opposite direction to surface 2A. In surface 2B are located a plurality (four are present, there may be more or less, but corresponding with the number of part mould cavities 11 and 21) of fifth part mould cavities 51. These part mould cavities 51 define the shape of part of the elastomer grip pad of a toothbrush handle facing in the bristle direction, i.e. the top surface 106A of the grip pad 106 shown in FIG. 1.

It is seen in the above description and drawings that in the mould assembly shown in FIG. 2, the third (3) and fourth (4) mould blocks comprise the respective first and second mould blocks, and the sub-assembly of first (1) and second (2) mould blocks comprises an intermediate third mould block of the broadest aspect of the invention as defined above.

The mould assembly shown in FIG. 2 is used in the process of the invention to make two component toothbrushes as follows.

Figure 3A:
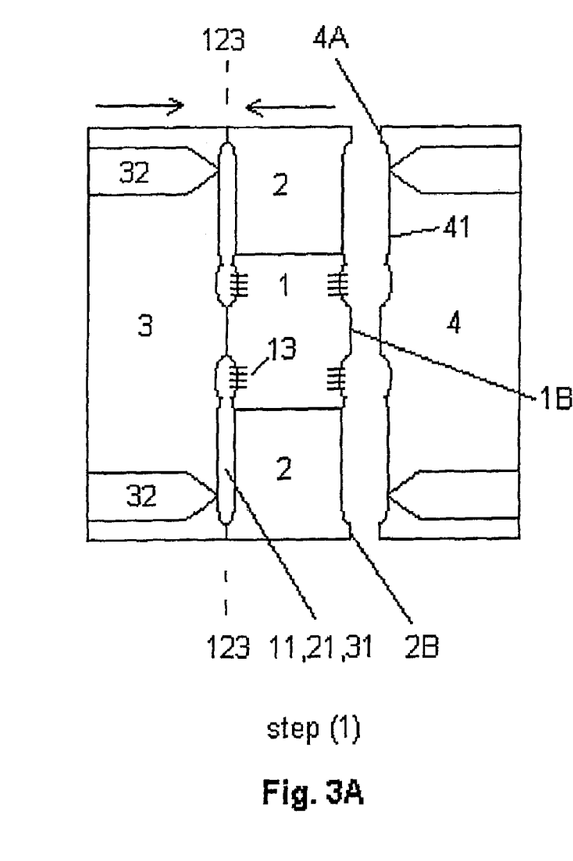

Referring to FIG. 3, steps (1) and (2) are shown. In FIG. 3A the first 1, second 2 and third 3 mould blocks are brought together by relative movement in the direction shown by arrows, so that the respective first 11A, second 21 and third 31 part mould cavities therein together form a mould cavity 11A,21,31 for forming part of the skeleton 105 of a toothbrush head and handle therein. In this operation the surfaces 1A, 2A and 3A of mould blocks 1, 2 and 3 meet at the parting line 123.

Figure 3B:
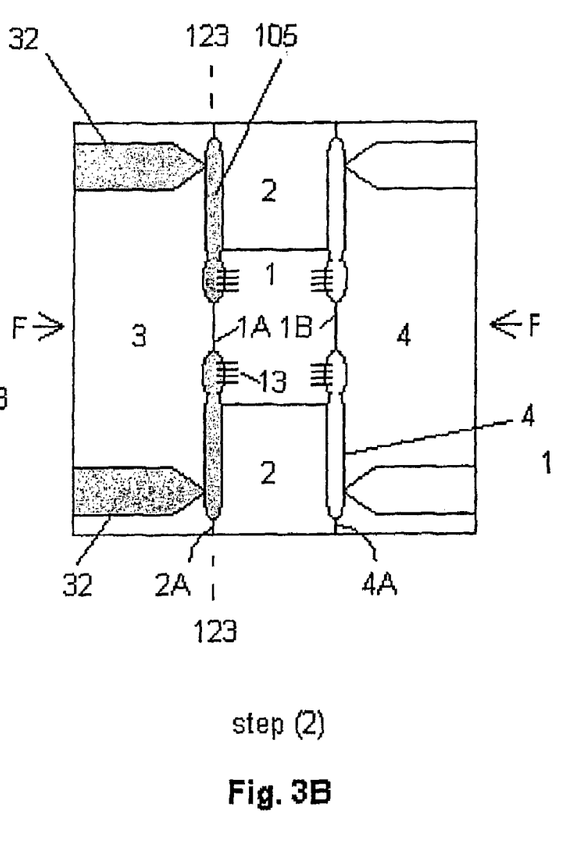

As shown in FIG. 3B a fluid plastic first material has been injected via injection ports 32 into the so-formed mould cavity 11A,21,31 to thereby form the skeleton 105 of a toothbrush head and handle therein. This first material is then allowed to harden. In FIGS. 2 and 3 bristle pins 13 are shown which project into the cavity 11A,21,31 so that bristle holes 109 are left in the so-formed head 102.

Also as shown in FIG. 3B, prior to the injection of plastic material via port 32, the fourth mould block 4 is brought together to form a stack with the assembly of mould blocks 1, 2 and 3. In this operation, surface 4A of mould block 4 comes into contact with respective surfaces 1B and 2B of mould blocks 1 and 2, being the surfaces of blocks 1 and 2 opposite surfaces 1A, 2A in which the part mould cavities 11A, 21A are formed. This enables a clamping force F to be applied in the direction of the arrows shown to thereby enable the assembly to withstand the pressure generated in the cavity 11A, 21, 31 by the injection of the plastic material.

Figure 4:
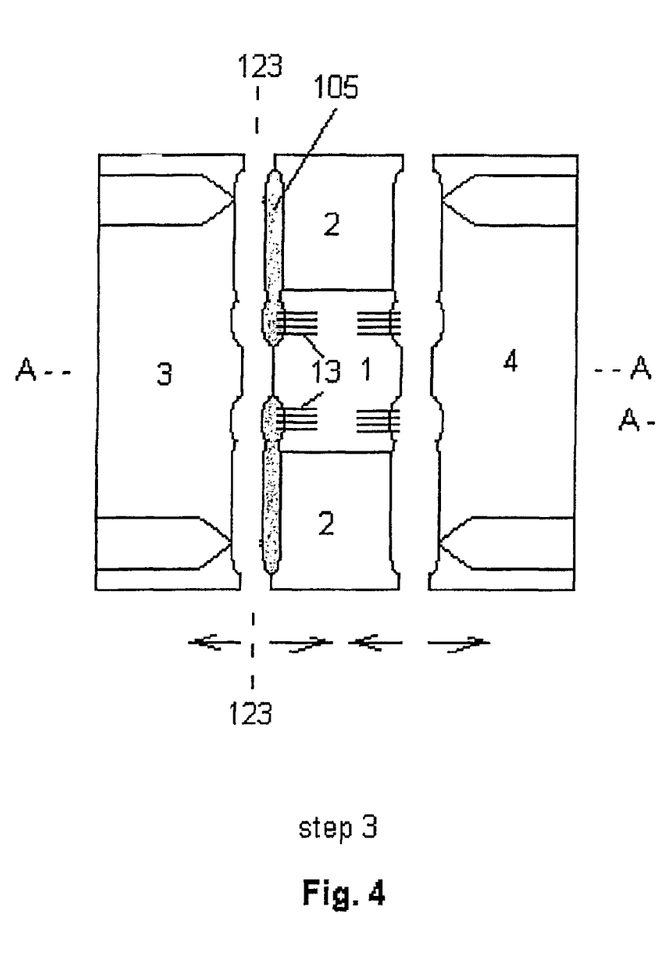

Referring to FIG. 4, step (3) is shown. The third mould block 3 is separated from the assembly of first 1 and second 2 mould blocks whilst retaining the skeleton 105 of the toothbrush, comprising both head and handle parts, in the first mould block 1 by its head 102. This is achieved by relative movement of the mould blocks 1, 2 and 3 in the direction shown by arrows. The toothbrush skeleton 105 is retained in mould block 1 by means of bristle pins 13 embedded in the formed toothbrush head 102. These bristle pins 13 are retractable by a mechanism (not shown) of known type within block 1.

As part of the same operation the fourth mould block 4 is withdrawn from the assembly of mould blocks 1 and 2, i.e. by relative motion in the direction indicated by the arrows.

Figure 5:
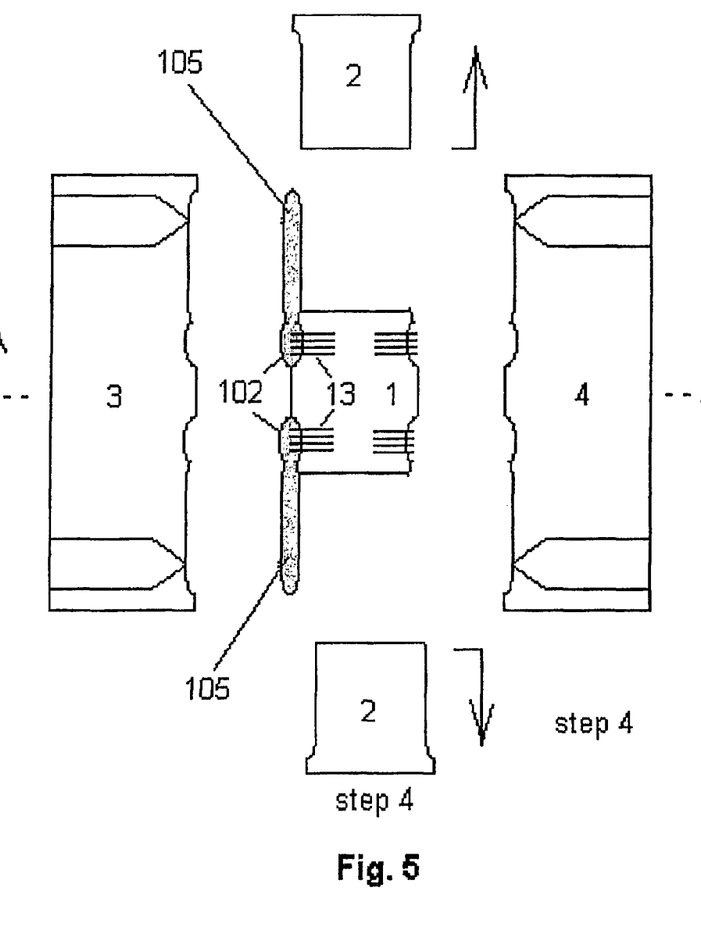

Referring to FIG. 5, step (4) is shown. The second mould blocks 2 are separated from the first mould block 1 whilst leaving the skeleton 105 of the toothbrush retained by its head 102 in a first part mould cavity 11A of the first mould block 1, by means of bristle pins 13 embedded in the formed toothbrush head 102. This separation is achieved by a motion of the second mould block 2 as shown by the arrows, being a first movement in the direction A—A followed by a movement transverse to direction A—A.

Figures 6A, 6B:
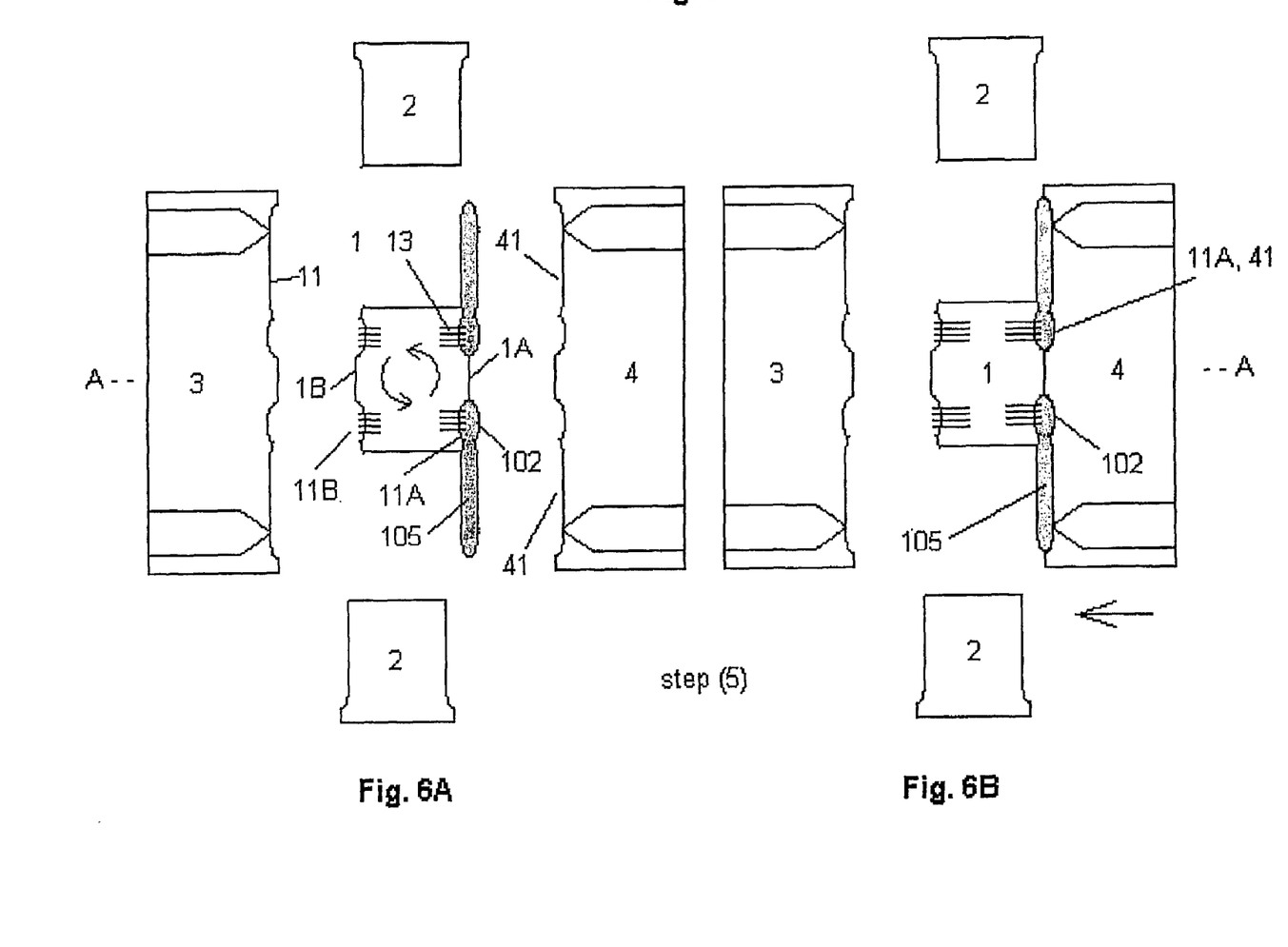

Referring to FIG. 6, step (5) is shown. In FIG. 6A the first mould block 1 has been rotated through 180° in the plane of the drawing, so that surface 1A in which its first part mould cavity(ies) 11A are formed and in which the part formed toothbrush head 102 is retained faces the fourth mould block 4. By this rotation it is seen that surface 1B of mould block 1, in which are the further first mould cavities 11B, now face the third mould block 3. The second 2 and third 3 mould blocks, (and the fourth mould block 4) must be sufficiently clear of the rotating first mould block 1 that the retained skeleton(s) 105 therein can rotate freely as shown.

The first mould block 1 and fourth mould block 4 are brought together so as to partly enclose the part formed toothbrush 105 retained by its head 102 in the first part mould cavity 11A in a cavity 11A,41 formed between the first mould block 1 and a fourth part mould cavity 41 in the fourth mould block 4.

Figure 7:
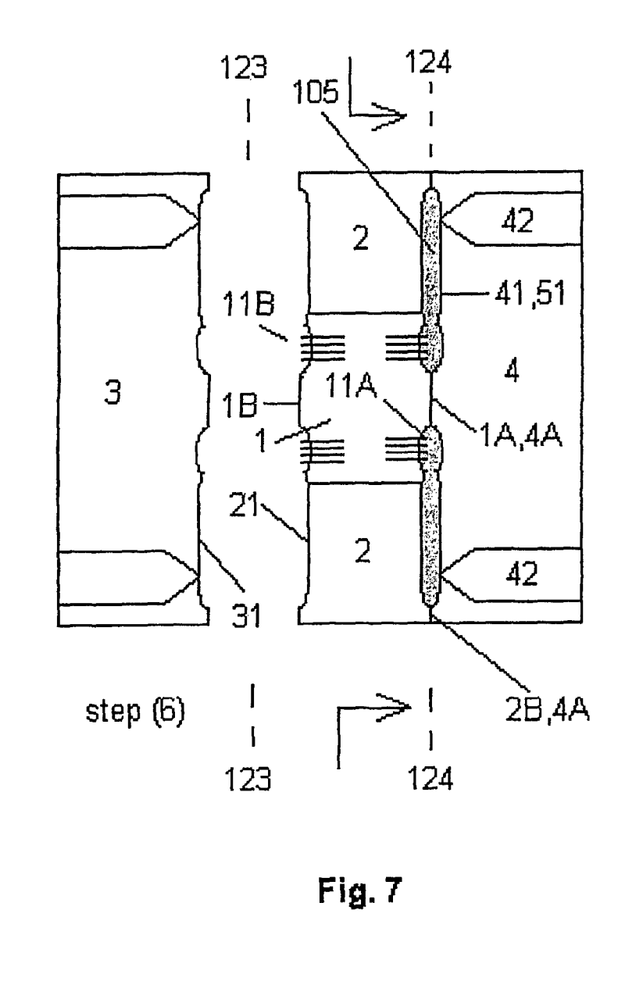

Referring to FIG. 7, step (6) is then performed. As shown in FIG. 7, the part-formed toothbrush handle, i.e. the part of skeleton 105 which comprises handle 103 is enclosed in a handle mould cavity 41,51 formed between a fourth mould cavity 41 in the fourth mould block 4 and a fifth mould cavity 51 in a second mould block 2. This is achieved by a movement of the second mould block 2 as shown by the arrows, so that surfaces 1A, 2B and 4A of respective mould blocks 1, 2 and 4 meet.

Figure 8:
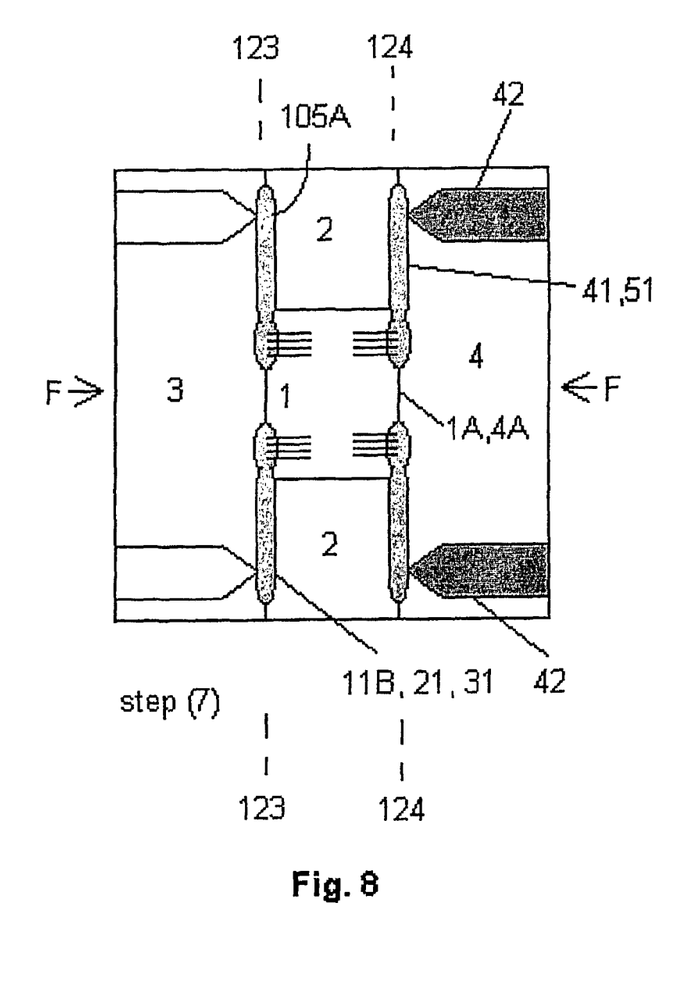

As shown in FIG. 8 step (7) is now performed by injecting a fluid second material, an elastomeric material, into the so-formed handle mould cavity 41, 51 via injection ports 42. Not shown for simplicity in FIGS. 2–8 is that part mould cavities 41 and 51 are shaped so as to define voids around the outer surface of a skeleton 105 when enclosed therein, into which the second material may flow upon being injected into cavity 41,51 to form the elastomer parts 106 of the toothbrush 101. This second material is then allowed to harden.

Also as shown in FIG. 8, prior to the injection of plastic material via ports 42, the third mould block 3 is brought together to form a stack with the assembly of mould blocks 1 and 2. This enables a clamping force F to be applied in the direction of the arrows shown to thereby enable the assembly to withstand the pressure generated in the cavity 41,51 by the injection of the elastomer material 106.

Also the respective further first 11B, second 21 and third part mould cavities 31 therein together form a mould cavity 11B, 21, 31 for forming part of a toothbrush head and handle therein in a manner identical to steps (1) and (2) as described with reference to FIG. 3 above, so that step (1) can be repeated to form further skeletons 105A therein. In such a way, steps (1) and (6) may advantageously be performed substantially simultaneously.

The mould block 4 may then be separated from the assembly of mould blocks 1 and 2 and the bristle pins 13 withdrawn from the heads 102 to allow step (8) to take place, i.e. ejecting or allowing the toothbrushes to fall from the mould block assembly. Conventional ejector pins (not shown) may also be used to urge the so-formed toothbrushes out of the part mould cavities 41,51, and/or the part mould cavities 11A, 11B in mould block 1.

The mould blocks 1, 2 and 3 may also be separated, i.e. in a step (3) as described above, and steps (4), (5) etc. may then be performed on the so formed skeletons 105A.

The so-formed toothbrushes may then be subjected to finishing operations, e.g. the insertion of bristles into bristle holes 109. This separation of the mould assembly returns the assembly to the configuration shown in FIG. 2, enabling the above described steps (1) to (8) to be optionally repeated so as to provide continuous production of toothbrushes.

Figure 9:
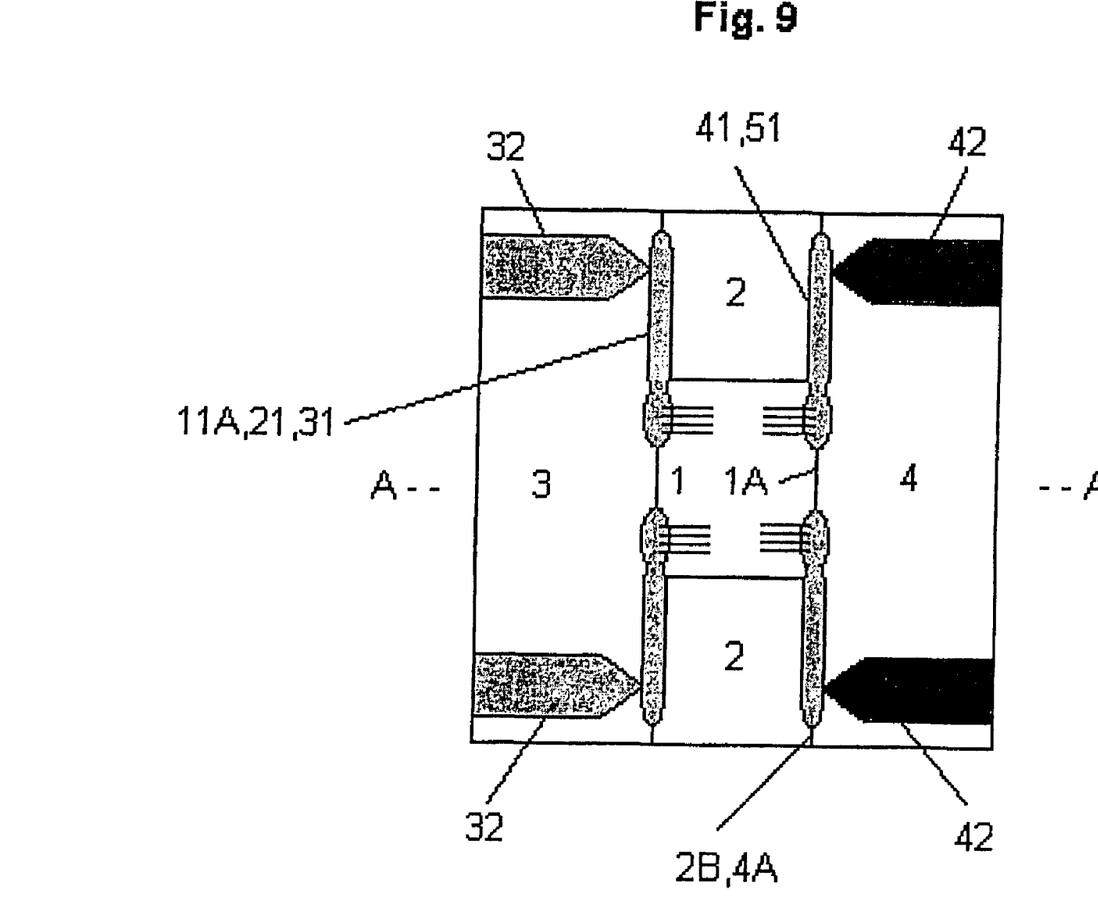

FIG. 9 shows a mode of operation of the process of the invention in which injection steps (2) and (7) are being performed with the mould assembly stacked together as shown in FIG. 8. These injection steps (2) and (7) may be performed substantially simultaneously, that is the first material may be injected via ports 32 into cavity 11A, 21, 31 whilst the second fluid material is injected substantially simultaneously into cavity 41,51 via port 42. Thereafter the mould block 4 may be separated from the assembly of mould blocks 1 and 2, and the toothbrushes formed in the cavity 41,51 may be removed as described above, but leaving the part formed toothbrushes formed in part mould cavities 11,21,31 retained by their heads as in FIG. 4 to result in a configuration of mould blocks as shown in FIG. 4, and the above described sequence of steps from step (3) onwards may be performed again in a continuously repeated operation.

The various mould blocks 1, 2, 3, 4 may be constructed in standard ways and operated by standard machinery known in the art of toothbrush manufacture, and the overall process may be automated. Each of the mould blocks mentioned herein may themselves comprise a sub-assembly of part mould blocks suitably fastened together.

The invention claimed is:

1. A stack mould assembly (1, 2, 3, 4) comprising;
a first mould block (1) having at least two first part mould cavities (11A) therein for forming part of a toothbrush head therein, at least one such first part mould cavity (11A) being respectively in each of two opposite-facing surfaces (1A, 1B) of the first mould block (1);
a second mould block (2) having at least one second part mould cavity (21) therein for forming part of a toothbrush handle therein, the first (11A) and second (21) part mould cavities capable of mating together to form a part mould cavity (11A, 21) defining part of the head and handle of a toothbrush to be formed therein;
a third mould block (3) having at least one third part mould cavity (31) therein for forming part of a toothbrush therein, the third part mould cavity (31) capable of mating together with the first and second part mould cavities (11A, 21) to form a part mould cavity (11A, 21, 31) defining part of the head and handle of a toothbrush to be formed therein;
a fourth mould block (4) having at least one fourth part mould cavity (41) therein for forming part of a toothbrush, the fourth part mould cavity (41) and first part mould cavity (11A) being capable of mating together to form a part mould cavity (11A, 41) defining part of the head and handle of a toothbrush to be formed therein;
the said first (1), second (2), third (3) and fourth (4) mould blocks being arranged in a stack mould assembly such that the first (1) and second (2) mould blocks are intermediate in a stack between the said third (3) and fourth (4) mould blocks;
a fifth part mould cavity (51) being provided in a mould block (2), the fifth part mould cavity (51) capable of mating together with the first and fourth part mould cavities (11A, 41) to form a part mould cavity (41, 51) defining part of the head and handle of a toothbrush to be formed therein.

2. A stack mould according to claim 1 wherein the third part mould cavity in the third mould block defines part of a toothbrush head and handle.

3. A stack mould according to claim 1 wherein the fifth part mould cavity is formed in the second mould block in a surface of the second mould block opposite that in which the second part mould cavity is formed.

4. A stack mould according to claim 1 wherein the first mould block is mounted for rotation relative to the third and fourth mould blocks so that the first part mould cavity(ies) in the first mould block may be rotated to face the fourth mould block.

5. A stack mould according to claim 1 wherein the first mould block has a surface opposite to that in which the first part mould cavity is formed, and in the opposite surface there is one or more further first part mould cavity.

6. A stack mould according to claim 5 wherein the further first part mould cavity is identical to the first part mould cavity.

7. A stack mould according to claim 6 wherein at least one further first part mould cavity may be brought together with a second part mould cavity in a second mould block.

8. A stack mould according to claim 7 wherein when at least one further first part mould cavity is brought together with a second part mould cavity in a second mould block, the first, second and third mould blocks fit together so that the respective further first, second and third part mould cavities therein mate together form a mould cavity for forming part of a toothbrush head and handle therein.

9. A stack mould according to claim 2 wherein the fifth part mould cavity is formed in the second mould block in a surface of the second mould block opposite that in which the second part mould cavity is formed.

* * * * *